Nov. 29, 1966 J. V. ANDERS ETAL 3,289,120

VARIABLE ELECTRIC ATTENUATOR NETWORKS

Filed Oct. 18, 1963 2 Sheets-Sheet 1

INVENTORS J. V. ANDERS
E. C. SNYDER, JR.
BY H. L. Logan
ATTORNEY

DIODE EQUIVALENT

EQUIVALENT FOR BRIDGED-T DIODE CCT.

EQUIVALENT FOR BRIDGED-H DIODE CCT.

United States Patent Office 3,289,120
Patented Nov. 29, 1966

3,289,120

VARIABLE ELECTRIC ATTENUATOR NETWORKS

James V. Anders, Succasunna, and Edwin C. Snyder, Jr., Mendham, N.J., assignors to Bell Telephone Laboratories, Incorporated, New York, N.Y., a corporation of New York Filed Oct. 18, 1963, Ser. No. 317,385
11 Claims. (Cl. 333—81)

Figure 1:
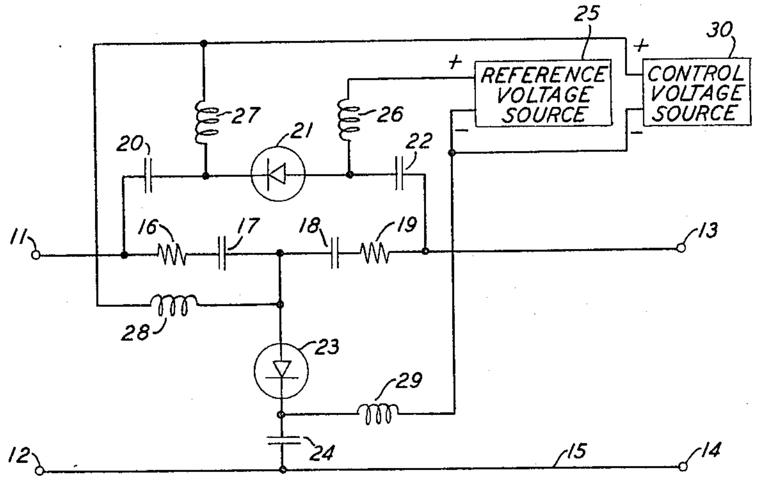

This invention relates to electrical transmission networks and in particular to networks having substantially constant characteristic impedances while their attenuation characteristics are controllable.

Electrical transmission networks having substantially constant characteristic impedance (that is, networks whose input and output impedances remain substantially equal and constant) and attenuation characteristics which are controllable are highly desirable in many kinds of transmission arrangements. Bridged-T and bridged-H networks, as well known to those skilled in the art, may be designed to have these characteristics. In the bridge-T network, a constant characteristic impedance is accomplished by maintaining the impedance values of each of the serially connected elements substantially equal to the desired characteristic impedance of the network while maintaining the impedance values of the shunting and bridging elements so that the square root of their products always remains substantially equal to the desired characteristic impedance of the network. Although the products of the impedance values of the shunting and bridging elements are maintained constant, the attenuation produced by the network is changed by changing the relative impedance values of these elements. The bridged-H network is similarly constructed.

The prior art includes several techniques for controlling the attenuation of bridged-T and bridged-H networks in response to a single control voltage. One of these techniques involves the use of additional circuitry to produce, in response to a single control voltage, a pair of control voltages for controlling the variable elements, respectively, to exhibit the desired product relationship. Another technique involves constructing the variable elements so that they exhibit the desired characteristics when being acted upon by a single control voltage. These and other techniques have been found, however, to be undesirable.

An object of the present invention is to use conventional components in variable attenuators having constant characteristic impedance so that the attenuating controlling elements in each attenuator are directly controllable by a single control voltage.

This and other objects of the invention are achieved in bridged-T and bridged-H circuit configurations in which the shunting elements and the bridging elements comprise diodes. The alternating current impedance characteristics of the diodes are controlled in a unique manner in each of the configurations through the use of a direct current reference voltage and a direct current control voltage. In particular, the reference voltage is applied so that it appears in a forward biasing sense across the diodes connected in series while the control voltage is applied across either the shunting or bridging diodes. By this arrangement, the total forward biasing voltage across the diodes remains substantially contant while the division of this voltage between the diodes is controlled. Although a theory of operation is presented in greater detail in the following description of several embodiments of the invention, it may be briefly stated at this point that the constant reference voltage determines and maintains substantially constant the product of the alternating current impedances, thereby producing a substantially constant characteristic impedance, while the control voltage determines the impedance values of the diodes, thereby determining the value of the attenuation of the network. The invention therefore permits the attenuation characteristic of substantially constant characteristic impedance networks to be controlled in a direct manner with a single direct current control voltage.

In one embodiment of the invention taking the form of a bridged-T network, the bridging and shunting elements comprise PIN diodes, respectively, which are capacitively coupled to the remainder of the network. The diodes are inductively connected in series so that the diodes are poled in the same direction and are isolated from one another at the frequencies at which the network is intended for use. A source providing a direct current reference voltage is inductively connected across the serially connected diodes to bias the diodes in a forward direction. A second source providing a variable direct current control voltage is inductively connected across one of the diodes. By this arrangement, the reference voltage maintains a constant voltage across the serially connected diodes, thereby determining and maintaining substantially constant the square root of the products of the diode impedances equal to the desired characteristic impedance of the network. Because, however, the control voltage determines the division of the reference voltage between the diodes, the attenuation of the network is controllable while the characteristic impedance is maintained substantially constant.

Another embodiment of the invention takes the form of a bridged-H network in which the bridging elements comprise PIN diodes while the shunting branch comprises a pair of PIN diodes connected in series and both poled in the same direction. A reference potential source is connected across the serially connected diodes so that the diodes are biased in a forward direction while a control voltage source is connected across either the bridging diodes or the shunting diodes so that the division of the reference voltage between the series and shunting elements may be controlled. As in the above-described bridged-T embodiment, the bridged-H embodiment employs capacitive and inductive coupling elements to limit the alternating and direct currents to the desired paths. Furthermore, as in the bridged-T configuration, the reference voltage determines and maintains the square root of the diode impedances equal to the desired characteristic impedance while the control voltage determines the attenuation characteristic of the network.

One advantage of the invention is that the transmission paths of embodiments of the invention appear substantially resistive to relatively wide frequency bands.

Another advantage of the invention is that a plurality of networks constructed in accordance with the invention may be operated from the same reference and control voltage sources so that the networks are controllable in unison to track one another. In particular, it may be desirable to use two or more embodiments of the invention connected in series in a single transmission path or connected in respective transmission paths and to have the embodiments follow or track one another in attenuation. When such uses are desired, the direct current reference voltage path is arranged to include all of the bridging and shunting elements connected in series. These elements are connected so that the bridging elements appear as a first group of serially connected elements and the shunting elements appear as a second group of serially connected elements in the reference voltage path. The direct current control voltage is applied across one of the serially connected groups of elements to control the attenuation of the networks. Because the bridging and shunting elements are substantially identical to one another, the direct current voltage appearing across the group of serially connected bridging elements and the direct current voltage appearing across the group of serially connected shunting elements divide substantially equally between the elements in the group. This substantially equal dividing action of the group voltages between the members of the groups results in each network having substantially the same attenuation for each setting of the control voltage.

Other objects and features of the invention will become apparent from a study of the following detailed descriptions of several embodiments.

Figure 2:
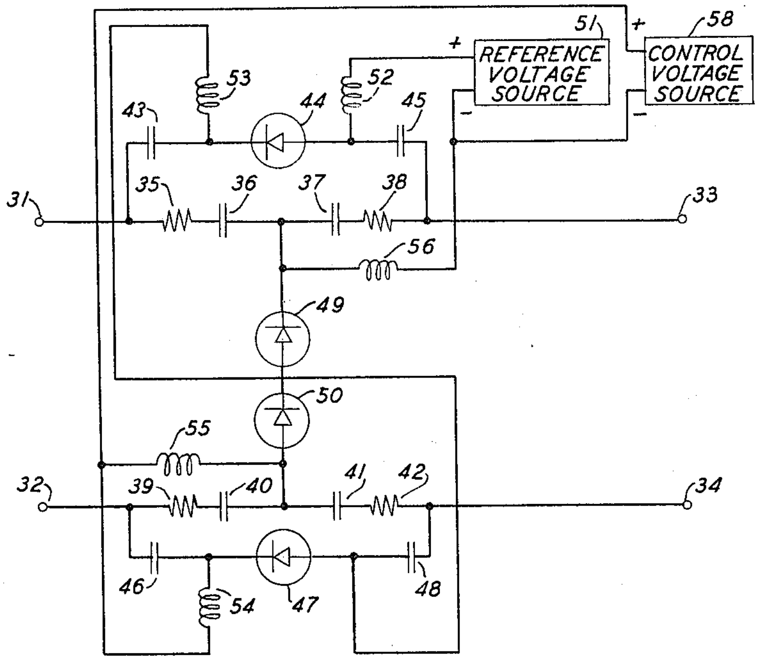

In the drawings:

FIGS. 1 and 2 each disclose an embodiment of the invention; and

Figure 3A:
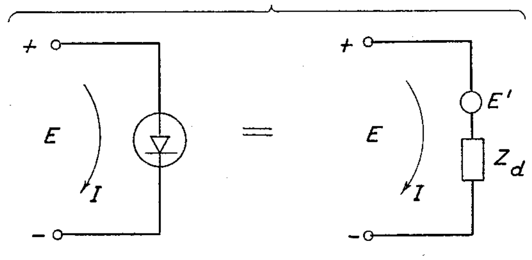
Figure 3B:
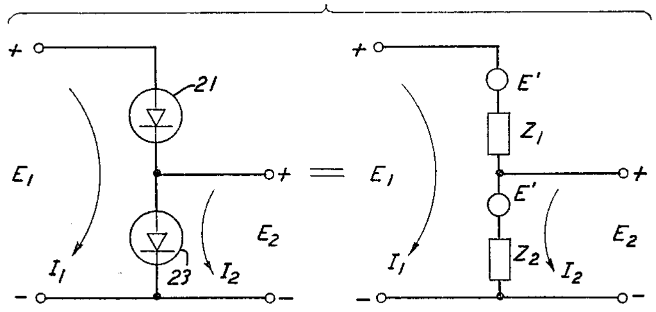
Figure 3C:
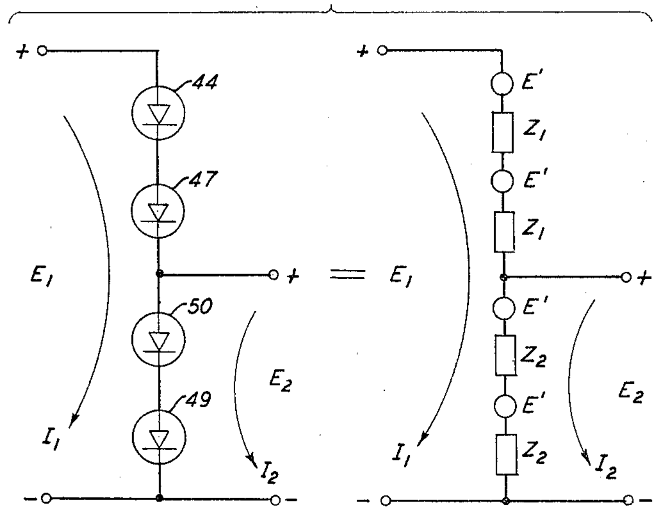

FIGS. 3A through 3C disclose schematic diagrams used in explaining the theories of operation of the embodiments of FIGS. 1 and 2.

FIG. 1 discloses one embodiment of the invention taking the form of a bridged-T circuit. The circuit of FIG. 1 has a pair of input terminals 11 and 12 and a pair of output terminals 13 and 14. Input terminal 12 is connected to output terminal 14 by a conductor identified as 15. A resistor 16, a capacitor 17, a second capacitor 18 and a second resistor 19 are connected in series in that order between input terminal 11 and output terminal 13. Resistors 16 and 19 each have an impedance value equal to the desired characteristic impedance of the network. A capacitor 20, a PIN diode 21 and another capacitor 22 are connected in series in that order between input terminal 11 and output terminal 13. A second PIN diode 23 and still another capacitor 24 are connected in series between the junction of capacitors 17 and 18 and conductor 15. Capacitors 17, 18, 20, 22, and 24 are selected to provide direct current isolation while introducing negligible impedance in the circuit to currents at the frequencies of operation. A reference voltage is applied to diodes 21 and 23 by a reference voltage source 25 and a plurality of inductors 26 through 29. In particular, the positive terminal of source 25 is connected to the anode of diode 21 by an inductor 26; the cathode of diode 21 is connected to the anode of diode 23 by way of inductors 27 and 28 connected in series; and the cathode of diode 23 is connected to the negative terminal of source 25 by conductor 29. Inductors 26 through 29 are selected to provide direct current continuity while providing relatively high impedances for isolation purposes to currents at the frequencies at which the network is intended for use. Source 25 and inductors 26 through 29 cooperate to place a fixed forward biasing voltage across the series combination of diodes 21 and 23. A control voltage source 30 has its positive terminal connected to the junction between inductors 27 and 28 and its negative terminal connected to the terminal of inductor 29 which is connected to the negative terminal of source 25. Control voltage source 30, in cooperation with inductors 28 and 29, determines the voltage appearing across diode 23 and, inasmuch as a fixed potential appears across the series combination of the diodes, control source 30 also determines the voltage appearing across diode 21. Stated in another manner, source 25 determines the fixed voltage applied across the series combination of diodes 21 and 23 while control voltage source 30 determines the way that this voltage is divided between the two diodes. The constant voltage provided by source 25 across the series combination of the two diodes maintains substantially constant the products of the two impedances presented by the diodes while the control voltage provided by source 30 across diode 23 controls the relative values of the impedances presented by the diodes, thereby controlling the attenuation characteristic.

The following mathematical proof is presented with respect to FIG. 1 to illustrate how the products of the two alternating current impedances of the diodes remain substantially constant, thereby providing a substantially constant characteristic impedance, when the attenuation of the network is changed.

FIG. 3A shows a diode having a voltage E across it and a current I through it and its equivalent circuit arrangement comprising a serially connected source of voltage E′ and an element of impedance $Z_d$. The following expressions, which may be verified experimentally, apply to the equivalent circuit:

$$Z_d=\frac{K}{I^k} \quad (1)$$

and $$E=m\log(I)+E' \quad (2)$$

where K, *k*, *m* and E′ are constants.

FIG. 3B shows a direct current path including diodes 21 and 23 of FIG. 1 with a reference voltage $E_1$ and a control voltage $E_2$. Current $I_1$ is the left-hand loop current while current $I_2$ is the right-hand loop current. FIG. 3B also shows the equivalent circuit for the two serially connected diodes. Each of the diodes is represented by a source of voltage E′ and an impedance element; the value for the impedance element representative of diode 21 is $Z_1$ while that of the impedance element representative of diode 23 is $Z_2$.

In order for the embodiment of FIG. 1 to have a substantially constant characteristic impedance with changes in attenuation, it is necessary that the products of $Z_1$ and $Z_2$ of FIG. 3B remain substantially constant when voltage $E_1$ is maintained substantially constant and voltage $E_2$ is varied over a range where the diode characteristics presented in Equations 1 and 2 remain substantially true. For the voltage E across diode 21 of FIG. 3B, $$E=E_1-E_2 \quad (3)$$

while for the voltage E across diode 23 of FIG. 3B, $$E=E_2 \quad (4)$$

From Equation 1, $$Z_1Z_2=\left(\frac{K}{I_1^k}\right)\left(\frac{K}{(I_1+I_2)^k}\right) \quad (5)$$

From Equations 2 and 3, $$I_1=10\left(\frac{E_1-E_2-E'}{m}\right) \quad (6)$$

From Equations 2 and 4, $$I_1+I_2=10\left(\frac{E_2-E'}{m}\right) \quad (7)$$

Placing Equations 6 and 7 in Equation 5 produces, $$R_1Z_2=\frac{K^2}{10\left(\frac{E_1-2E'}{m}\right)k} \quad (8)$$

Equation 8 does not include voltage $E_2$. Furthermore, all of the terms in the equation have constant values. The products of impedances $Z_1$ and $Z_2$ therefore remain substantially constant as long as control voltage changes remain in a range where the diode characteristics as expressed by Equations 1 and 2 remain substantially true, thereby providing a substantially constant characteristic impedance.

Another embodiment of the invention taking the form of a bridged-H circuit is disclosed in FIG. 2. This embodiment includes a pair of input terminals 31 and 32 and a pair of output terminals 33 and 34. A resistor 35, a capacitor 36, a second capacitor 37 and a resistor 38 are connected in series in that order between input terminal 31 and output terminal 33. A resistor 39, capacitor 40, a capacitor 41 and a resistor 42 are connected in series between input terminal 32 and output terminal 34. A capacitor 43, a PIN diode 44 and a capacitor 45 are connected in series in that order between input terminal 31 and output terminal 33. In the lower part of the schematic diagram, a capacitor 46, a PIN diode 47 and a capacitor 48 are connected in series in that order between input terminal 32 and output terminal 34. A PIN diode 49 and a PIN diode 50 are connected in series between the junction of capacitors 36 and 37 and the junction of capacitors 40 and 41. Diodes 49 and 50 are both poled in the same direction with the cathode of diode 50 connected to the anode of diode 49. A reference voltage is applied to the diodes by way of a source 51 and a plurality of inductors identified as 52 through 56. In particular, inductor 52 is connected between the anode of diode 44 and the positive terminal of source 51; inductor 53 is connected between the cathode of diode 44 and the anode of diode 47; inductors 54 and 55 are connected in that order in series between the cathode of diode 47 and the anode of diode 50; and inductor 56 is connected between the cathode of diode 49 and the negative terminal source 51. A control voltage is applied to diodes 49 and 50 by way of a control voltage source 58 and inductors 55 and 56. In particular, the positive terminal source 58 is connected to the terminal of inductor 55 opposite to that connected to diode 50 while the negative terminal of source 58 is connected to the terminal of inductor 56 which is opposite to that connected to diode 49. Reference voltage source 51 maintains a substantially constant voltage across diodes 44, 47, 49 and 50 connected in series while control voltage source 58 determines the division of the voltage provided by source 51 between the bridging diodes 44 and 47 and the shunting diodes 49 and 50. The attenuation provided by the network is controlled by the control voltage provided by source 58 while the characteristic impedance of the network is maintained substantially constant by the reference voltage applied across the serially connected diodes by source 51.

In the embodiment of FIG. 2, the product of the summation of the alternating current impedances of the shunting diodes and the summation of the alternating current impedances of the bridging diodes remain substantially constant for all values of the applied control voltage thereby providing a variable atteunation having a substantially constant characteristic impedance. A mathematical proof illustrating that this product remains substantially constant for different values of control voltage is very similar to that presented above for the embodiment of FIG. 1. The proof is therefore not presented herein. FIG. 3C, however, shows the equivalent circuit for the diodes of FIG. 2. The product equation using the symbols used in FIG. 3C takes the following form:

$$(Z_1+J_1')(Z_2+Z_2')=\frac{4K^2}{10\left(\frac{E_1-2E'}{m}\right)k} \qquad (9)$$

It should be noted that voltage $E_2$ does not appear in Equation 9 and furthermore all of the terms in the equation have constant values over the intended range of operation. The products of the impedance sums therefore remain substantially constant as long as the control voltage variations remain in a range where the diode characteristics as expressed by Equations 1 and 2 remain substantially true, thereby providing substantially constant input and output impedances.

It should be noted that although PIN doides are used in the illustrated embodiments, other diodes may be used as long as the requirements of Expressions 1 and 2 are present.

Although only two embodiments of the invention have been disclosed and described in detail, various other embodiments may be devised by those skilled in the art without departing from the spirit and scope of the present invention.

What is claimed is:

1. An electrical network comprising
a pair of input terminals,
a pair of output terminals,
first and second paths connecting one of said input terminals to one of said output terminals and the other of said input terminals to the other of said output terminals, respectively, wherein at least one of said paths includes impedance elements,
means including at least one diode having one terminal connected to substantially the impedance midpoint of said first path and the other terminal connected to substantially the impedance midpoint of said second path and providing alternating current continuity and direct current isolation between said first and second paths,
means, each of which includes a diode and has alternating current continuity and direct current discontinuity, connected in parallel with said paths including impedance elements, respectively,
first voltage means serially connecting all of said diodes and applying a first direct current voltage thereacross to forward bias said diodes, and
second voltage means connected to apply to at least one of said diodes a second direct current voltage.

2. A network in accordance with claim 1 in which
said first voltage means comprises a source of direct current reference potential and inductive means connected between said diodes and between said diodes and said source to apply a substantially constant direct-current forward biasing potential across the series combination of said diodes and
said second voltage source comprises a source of direct current control potential connected to said inductive means to apply at least a portion of the potential from said source of control potential across at least one of said diodes.

3. An electrical network comprising
a bridged-type attentuator in which the bridging and the shunting paths each comprise at least one diode and means to render the path discontinuous to direct current,
means connecting said diodes in series, with said diodes all poled in the same direction, to produce a relatively low impedance direct current circuit and a relatively high impedance alternating current circuit,
a source of direct current reference potential connected across said serially connected diodes to forward bias said diodes, and
a source of direct current control potential connected to said serially connected diodes to apply to at least one of said diodes a second direct current potential.

4. An electrical network comprising
a bridged-T attenuator in which the bridging and the shunting paths each comprise a diode and means to render the path discontinuous to direct current,
first inductive means connecting said diodes in series with said diodes poled in the same direction,
a direct current source of reference potential,
second inductive means connecting said serially connected diodes to said source of reference potential to forward bias said diodes,
a direct current source of control potential, and
means connecting said source of control potential to said inductive means to apply substantially all of said control voltage across one of said diodes.

5. An electrical network comprising
a bridged-H attenuator in which the bridging and shunting paths each include at least one diode and means to render the paths discontinuous to direct current,
first inductive means connecting said diodes in series with said diodes poled in the same direction,
a direct current source of reference potential,
second inductive means connecting said serially connected diodes to said source of reference potential to forward bias said diodes,
a direct current source of control potential, and
means connecting said source of control potential to said inductive means to apply substantially all of said control potential across the diodes in one of the types of paths comprising said diodes.

6. An electrical network comprising
a pair of input terminals,
a pair of output terminals,
a first path comprising at least two serially connected impedance elements connected between one of said input terminals and one of said output terminals,
a second path having substantially zero impedance connected between the other of said input terminals and the other of said output terminals,
a first diode,
means connecting one terminal of said first diode between said serially connected impedance elements and the other terminal of said first diode to said second path and providing alternating current continuity and direct current isolation between said first and second paths,
a second diode,
a first capacitor connected between one terminal of said second diode and one extremity of said first path,
a second capacitor connected between the other terminal of said second diode and the other extremity of said first path,
first voltage means serially connecting all of said diodes and applying a first direct current voltage thereacross to forward bias said diodes, and
second voltage means connected to apply to at least one of said diodes a second direct current voltage.

7. A network in accordance with claim 6 in which
said first voltage means comprises a source of direct current reference potential and inductive means connected between said diodes and between said diodes and said source to apply a substantially constant forward biasing potential across the series combination of said diodes, and
said second voltage source comprises a source of direct current control potential connected to said inductive means to apply at least a portion of the potential from said source of control potential across at least one of said diodes.

8. An electrical network comprising
a pair of input terminals,
a pair of output terminals,
first and second paths connecting one of said input terminals to one of said output terminals and the other of said input terminals to the other of said output terminals, respectively, wherein each of said paths comprises at least two serially connected impedance elements,
a pair of serially connected identically poled diodes,
means connecting one terminal of said serially connected diodes between said serially connected impedance elements in one of said paths and the other terminal of said serially connected diodes between said serially connected impedance elements in the other of said paths and providing alternating current continuity and direct current isolation between said first and second paths,
a third diode,
a first capacitor connected between one terminal of said third diode and one extremity of said first path,
a second capacitor connected between the other terminal of said third diode and the other extremity of said first path,
a fourth diode,
a third capacitor connected between the one terminal of said fourth diode and one extremity of said second path,
a fourth capacitor connected between the other terminal of said fourth diode and the other extremity of said second path,
first voltage means serially connecting all of said diodes and applying a first direct current voltage thereacross to forward bias said diodes, and
second voltage means connected to apply to at least two of said diodes of second direct current voltage.

9. A network in accordance with claim 8 in which
said first voltage means comprises a source of direct current reference potential and inductive means connected between said diodes and between said diodes and said source to apply a substantially constant forward biasing potential across the series combination of said diodes, and
said second voltage source comprising a source of direct current control potential connected to said inductive means to apply at least a portion of the potential from said source of control potential across at least one of said diodes.

10. An electrical network comprising
a pair of input terminals,
a pair of output terminals,
a first path comprising a first resistor, a first capacitor, a second capacitor and a second resistor serially connected in that sequence between one of said input terminals and one of said output terminals,
a second path having substantially zero impedance connected between the other of said input terminals and the other of said output terminals,
a first diode,
means connecting one terminal of said first diode to the junction between said first and second capacitors and the other terminal of said first diode to said second path,
a second diode,
a third capacitor connected between one terminal of said second diode and one extremity of said first path,
a fourth capacitor connected between the other terminal of said second diode and the other extremity of said first path,
first inductive means connected between the anode terminal of one of said diodes and the cathode terminal of the other of said diodes.
a source of reference potential,
second inductive means connected between the positive terminal of said reference potential source and the remaining anode terminal of said diodes,
third inductive means connected between the negative terminal of said reference potential source and the remaining cathode terminal of said diodes,
a source of control potential, and
means to connect said source of control potential to said inductive means to apply substantially all of said control potential across one of said diodes.

11. An electrical network comprising
a pair of input terminals,
a pair of output terminals,
a first path connected between one of said input terminals and one of said output terminals,
a second path connected between the other of said input terminals and the other of said output terminals,
each of said paths comprising a first resistor, a first capacitor, a second capacitor and a second resistor connected in series in that order,
first and second diodes connected in series and poled in the same direction to form a first diode series path,
means connecting said first diode series path between the junction of the first and second capacitors in said first and second paths,
third and fourth paths connected to bridge said first and second paths, respectively,
each of said third and fourth paths comprising a capacitor, a diode and a capacitor connected in series in that order,
first inductive means connecting said diodes in said third and fourth paths, in series with both of said diodes poled in the same direction to form a second diode series path,
second inductive means connecting said first and second diode series paths in series with all of said diodes poled in the same direction,
a source of reference potential, third inductive means connecting said source to said diodes to apply substantially all of said reference potential in a forward biasing series across all of said serially connected diodes, a source of control potenial, and means to connect said source of control potential to said inductive means to apply substantially all of said control potential across one of said diode series paths.

No references cited.

ELI LIEBERMAN, *Primary Examiner*.

R. F. HUNT, *Assistant Examiner*.